3,257,776
PROCESS FOR REDUCING THE CONCENTRATION OF MERCURY IN HYDROGEN GAS
Jong C. Park, Buffalo, and Leon O. Winstrom, East Aurora, N.Y., assignors to Allied Chemical Corporation, New York, N.Y., a corporation of New York
No Drawing. Filed Jan. 28, 1963, Ser. No. 254,458
1 Claim. (Cl. 55—72)

The present invention relates to an improved process for purifying hydrogen, and it is especially concerned with an improved process for reducing the concentration of mercury vapor in hydrogen.

Hydrogen produced by electrolysis of brine at a mercury cathode contains substantial quantities of mercury vapor, e.g., more than 20,000 micrograms of mercury per cubic meter, and is usually saturated with water vapor. It is desirable to remove substantially such mercury concentrations from hydrogen since the presence of mercury in hydrogen in amounts greater than about 25 micrograms, and in many cases about 10 micrograms per cubic meter, interferes with the use of the hydrogen in catalytic reductions of organic compounds.

The prior art methods of mercury removal are not entirely satisfactory. For example, it is known to remove mercury from hydrogen gas by chemical means, e.g., by converting mercury to mercurous chloride by treatment with chlorine gas in brine, but such methods require delicate control and may introduce additional objectionable impurities into the hydrogen. Further, it is known to adsorb mercury from hydrogen by passing the gas through a bed of activated charcoal. Charcoal, however, is a relatively inefficient adsorbent for mercury, and when saturated with mercury can only be partially reactivated.

It is also known to adsorb mercury from hydrogen by passing the hydrogen through a bed of particulate matter comprising metallic silver supported on particles of siliceous earth. This method is unsatisfactory, in that it is only effective with hydrogen gas which is substantially completely free from water vapor, even very small proportions of water vapor resulting in wetting of the siliceous earth support, causing it to crumble and disintegrate and rendering the material non-adsorbent. Moreover, even with moisture-free hydrogen gas, the siliceous earth supported silver particles become disintegrated and pulverized in short periods at the high gas velocities required for efficient commercial operation.

It is the object of the present invention to provide an improved, efficient method of reducing the concentration of mercury vapor in hydrogen.

It is a still further object of the invention to provide a process for rapidly reducing the concentration of mercury vapor from hydrogen containing water vapor in amounts up to the saturation point at the temperatures employed.

These and other objects are accomplished according to our invention wherein hydrogen gas contaminated with mercury vapor is passed at a temperature below the boiling point of mercury through a bed of particulate adsorbent comprising silver metal on a fused aluminum oxide support at a rate sufficient to substantially reduce the mercury content of the gas.

According to a preferred embodiment of our invention, hydrogen contaminated with mercury in amounts in excess of about 25 micrograms per cubic meter is passed at a temperature of about 0 to 50° C., through an adsorbent bed of fused aluminum oxide containing at least about 1%, but not more than about 15% of metallic silver by weight, preferably between about 5% and about 12% by weight metallic silver.

Under the preferred conditions of the process concentrations of mercury vapor in hydrogen from as low as about 25 micrograms to as high as about 20,000 to 35,000 or more micrograms per cubic meter can be reduced to less than about 25 micrograms, or even less than about 10 micrograms per cubic meter.

In carrying out the process according to our invention, particles of fused aluminum oxide containing at least about 1% by weight of silver metal supported thereon, preferably about 10%, are packed into a suitable column, either vertical, horizontal or inclined. Hydrogen gas contaminated with mercury, is then passed through the adsorbent at a space velocity effective to cause adsorption of substantially all, or the desired portion, of the mercury in the hydrogen. Adsorption is extremely rapid so that space velocities are not unduly critical and may range between .0016 and 16 in terms of volume of hydrogen (S.T.P.) per second per unit volume of adsorbent. Such velocities are usually sufficient for substantially complete removal of mercury from the gas, i.e., to values of not more than about 25 micrograms per cubic meter. The hydrogen gas contaminated with mercury should be passed through the adsorbent bed at temperatures below the boiling point of mercury, i.e., 357° C. At greater temperatures the high partial pressure of the mercury makes adsorption of mercury negligible. Preferably the temperature of the hydrogen gas to be purified is about 0° to 50° C. Conveniently hydrogen gas containing mercury vapor which is at a temperature above the preferred temperature range may be cooled by suitable means before contact with the adsorbent. On cooling, a portion of the mercury contained in the hydrogen usually condenses and thus can be removed. The process can be carried out with hydrogen gas at atmospheric, subatmospheric, or superatmospheric pressures.

The adsorbent employed in our novel process is of sufficient density and hardness to resist abrasion under flows of gas at high velocity. Furthermore, the adsorbent is also inert towards moisture which may be present in the hydrogen being purified. We prefer to use as adsorbent support in the present process fused aluminum oxide which is sold under the trade name Alundum, and when containing 10% by weight silver metal is commercially available as Davison Catalyst SMR-55. However, any silver-fused aluminum oxide composition can be employed. For example, a suitable adsorbent may be prepared by breaking into fragments an aluminum oxide ("Alundum") which contains 10% by weight clay as bonding additive. These fragments of suitable dimensions, e.g., roughly $\frac{3}{8}$ by $\frac{1}{2}$ inch, are then soaked in an aqueous solution of silver nitrate of sufficient strength to afford about 10% of silver on the finished adsorbent. The solution containing the carrier is evaporated to dryness. Size is not unduly critical and particles with diameters as large as an inch or more are satisfactory. The carrier with the silver nitrate thereon is then subjected to reduction with hydrogen at a temperature of approximately 330° C. The carrier is thus impregnated with metallic silver, and may be used in this form or crushed and screened to obtain particles of convenient size for packing.

The adsorbent, when saturated with mercury vapor, is readily reactivated by heating at a temperature of at least about 200° C. or higher for at least about 1 hour, preferably from about 1 to 6 hours, under a stream of dry, inert gas, e.g., nitrogen. Heating the saturated adsorbent at temperatures lower than about 200° C. for periods shorter than about one hour results in only partial reactivation of the adsorbent. Heating the saturated adsorbent at higher temperatures, e.g., about 600° C. or higher, for longer periods, e.g., about 6 hours or more, while effective, is unnecessary and may be destructive to the adsorbent. An excellent result is generally obtained by heating the saturated adsorbent at a temperature of about 230-250° C. for about 1 hour while passing a stream of dry nitrogen with a linear velocity of about 0.5 to 1 foot per second through the adsorbent. Conveniently the nitrogen used is preheated to the temperature employed in the reactivation. Advantageously, the adsorbent can be nitrogen treated before use in the present process in order to drive off gases adsorbed from the atmosphere. The adsorbent of the present procedure retains its adsorptive capacity for mercury after being reactivated as many as seven times.

The reactivation of adsorbent in the present process is carried out when the mercury concentration of hydrogen gas leaving the adsorption bed exceeds the maximum level desired, e.g., 10 micrograms per cubic meter.

For continuous operation two adsorption beds of the present invention can be connected in parallel, so that mercury removal from hydrogen can continue in one bed while the other bed is shut down for reactivation, conveniently an activated charcoal adsorption bed can be placed at the end of adsorption train to insure against carry-over of mercury in case of an accidental breakdown in the operation of the silver-aluminum oxide adsorption beds.

The present process is an efficient and convenient means of reducing the concentration of mercury vapor in hydrogen and employs a readily available, durable, water-resistant adsorbent which retains its adsorptive power after repeated reactivations.

The instant invention, although not requiring elaborate equipment, provides a convenient and economical method of producing hydrogen substantially free of mercury and therefore suitable for the catalytic reduction of organic compounds.

In the following examples which illustrate our invention, percentages are by weight and temperatures are in degrees centigrade.

*Example 1*

Fused aluminum oxide ("Alundum") spheres of 5/16 inch diameter containing about 10% by weight silver metal (Davison Catalyst SMR-55) were crushed and screened to obtain an adsorbent of 6 to 10 mesh particle size. The adsorbent was packed into a one inch diameter glass tube to provide a cartridge 20 inches in height, and hydrogen gas at 40° containing from 11.6 to 23.7 parts per million by volume of water vapor and containing about 20,000 to 25,000 micrograms of mercury per cubic meter (as determined by a General Electric Vapor Detector Model 9790339G-3) was passed through the adsorbent at an average flow rate of about 570 liters per hour and a linear velocity of 1.03 feet per second. The mercury concentration in the effluent hydrogen was determined by the Vapor Detector (suitable for determining mercury concentrations greater than about 25 micrograms per cubic meter) and in one instance by analysis of a gas sample with dithizone reagent (suitable for determining mercury concentrations below 25 micrograms per cubic meter) according to the method of E. B. Sandell, "Colorimetric Determination of Traces of Metals," Interscience Publishers, Inc., New York, N.Y., 1950, pp. 444-446. The results of this experiment are presented in Table I. The effective life of the adsorbent, i.e., the time required for the mercury concentration of the effluent hydrogen to exceed 25 micrograms per cubic meter, was about 25 hours.

TABLE I

| Time in Hours | Mercury Concentration in Hydrogen Entering Adsorption Tube, Micrograms per cubic meter | Mercury Concentration in Hydrogen Leaving Adsorption Tube, Micrograms per cubic meter |
| --- | --- | --- |
| 1 | 21,600 | Less than 25.[1] |
| 3 | 21,600 | |
| 8 | 20,800 | |
| 12 | 20,800 | |
| 19.25 | 21,600 | |
| 25.75 | | 40. |
| 27.25 | 23,200 | 90. |
| 28.75 | | 380. |
| 29.75 | 24,300 | 600. |
| 31.75 | 25,100 | 980. |
| 32.75 | | 1,530. |

[1] The mercury concentration as determined by dithizone reagent was 0.

*Example 2*

A 1 x 35 inch stainless steel tube was packed with a preheating section of 22 inches of fused aluminum oxide (3-6 mesh, Alundum AL-3) followed by 1 inch of glass wool and 11 inches (292.1 g.) of the 6-10 mesh silver-Alundum adsorbent described in Example 1. The tube and its contents were heated at 230° for one hour while passing a stream of nitrogen gas at 230° with a linear velocity of 0.5 foot per second through the adsorbent. The degassed adsorbent was removed and packed in a 1 x 16 inch glass tube. A stream of hydrogen at 40-41° with a linear velocity of 1.5 feet per second containing about 26,800 to 34,700 micrograms of mercury per cubic meter and about 11.6-23.7 parts per million by volume of water vapor was passed through the adsorbent substantially as described in Example 1. The effective life of the adsorbent, as measured by the Vapor Detector, was 13 hours.

*Example 3*

Hydrogen gas containing about 20,000-23,000 micrograms per cubic meters of mercury was passed over silver-alumina adsorbent substantially as described in Example 1, under conditions to reduce the mercury content to 25 micrograms or less per cubic meter. The effective life of the catalyst, i.e., the time required for the mercury concentration in the effluent hydrogen to exceed 25 micrograms per cubic meter, was measured. The spent adsorbent was reactivated by a degassing operation similar to that described in Example 2 and recharged to the adsorption tube. The adsorption-reactivation cycle was repeated six times without a substantial decrease in the activity of the freshly reactivated adsorbent. The details of this experiment are set forth in Table II.

TABLE II.—EFFECTIVE LIFE, BEFORE AND AFTER SUCCESSIVE REGENERATION CYCLES, OF SILVER/ALUMINUM OXIDE ADSORBENT IN 1 × 16 INCH BED UNDER CONTACT WITH HYDROGEN AT 40° C. CONTAINING 20,000–23,000 MICROGRAMS OF MERCURY PER CUBIC METER, FLOWING THROUGH THE BED AT 1.03 FEET PER SECOND WHEREIN MERCURY CONTENT IS CONTINUOUSLY REDUCED TO 25 MICROGRAMS OR LESS PER CUBIC METER

| Adsorption Pass | Avg. Mercury Concentration in Hydrogen Entering Adsorption Bed (Micrograms per cubic meter) | Effective Life of Adsorbent (hours) | Regeneration | Packing of 1 × 35″ S.S. Regeneration Tube | Linear Velocity of Nitrogen Gas (ft./sec.) | Temp. of Packing, ° | Regeneration Time (hours) |
|---|---|---|---|---|---|---|---|
| 1 | 19,800 | 13.5 | 1 | 15 inches of aluminum oxide (Al-3) 1 inch of glass wool, 18 inches of silver-Alundum adsorbent from Adsorption Pass 1. | 1.9 | 410 | 6 |
| 2 | 19,800 | 29.0 | 2 | 12 inches of nickel mesh, 14 inches of silver-Alundum adsorbent from Adsorption Pass 2. | 1.0 | 410 | 4 |
| 3 | 22,900 | 24.0 | 3 | 16 inches of aluminum oxide Al-3, 1 inch of nickel mesh, 14 inches of silver-Alundum adsorbent from Adsorption Pass 3. | 1.0 | 380 | 3.0 |
| 4 | 21,800 | 23.0 | 4 | 20 inches of aluminum oxide Al-3, 1 inch of glass wool, 12 inches of silver Alundum adsorbent from Adsorption Pass 4. | 0.5 | 410 | 1.0 |
| 5 | 21,800 | 23.5 | 5 | 22 inches of aluminum oxide Al-3, 1 inch of glass wool, 11 inches of silver-Alundum adsorbent from Adsorption Pass 5. | 0.5 | 410 | 1.0 |
| 6 | 23,200 | 23.0 | 6 | 22 inches of aluminum oxide Al-3, ½ inch of glass wool, 16 inches of silver-Alundum adsorbent from Adsorption Pass 6. | 1.0 | 235 | 1.0 |
| 7 | 23,200 | 19.0 | 7 | 16 inches of aluminum oxide Al-3, 1 inch of glass wool, 16½ inches of silver-Alundum adsorbent from Adsorption Pass 7. | 1.0 | 235 | 1.0 |
| 8 | 21,800 | 27.0 | | | | | |

Example 4

An experiment was carried out similar to that described in Example 3 except that the adsorbent employed was activated charcoal (4 × 12 mesh, "Darco," Atlas Powder Co.). It was found that the effective life of the adsorbent had decreased from 16 hours to 2 hours after only one reactivation. The details of this experiment are presented in Table III.

TABLE III.—EFFECTIVE LIFE, BEFORE AND AFTER SUCCESSIVE REGENERATION CYCLES, OF CHARCOAL ADSORBENT IN A 1 × 20 INCH BED UNDER CONTACT WITH HYDROGEN AT 40°–41° C. CONTAINING ABOUT 20,000 MICROGRAMS OF MERCURY PER CUBIC METER FLOWING THROUGH THE BED AT 1.03 FEET PER SECOND WHEREIN MERCURY CONTENT IS REDUCED TO 25 MICROGRAMS PER CUBIC METER

| Adsorption Pass | Avg. Mercury Concentration in Hydrogen Entering Adsorption Bed (Micrograms per cubic meter) | Effective Life of Adsorbent (hours) | Regeneration | Packing of 1 × 35″ S.S. Regeneration Tube | Linear Velocity of Nitrogen Gas (ft./sec.) | Temp. of Packing, ° | Duration of Heating Time (hours) |
|---|---|---|---|---|---|---|---|
| 1 | 21,300 | 16 | 1 | 15 inches of aluminum oxide Al-3, 1 inch of glass wool, 18 inches of charcoal adsorbent employed in Adsorption Pass 1. | 1.0 | 380 | 3.0 |
| 2 | 19,800 | 2 | | | | | |

Example 5

The following example illustrates use of the present process on a continuous basis.

Hydrogen gas containing about 20,000 micrograms of mercury per cubic meter flowing at an average rate of 303 standard cubic feet per minute under a pressure of about 80 pounds per square inch absolute is cooled from 25° to 5°, and the mercury which condenses is separated by means of a cyclone and removed. The cooled hydrogen under a pressure of 78 pounds per square inch absolute containing about 3,400 micrograms of mercury per cubic meter is passed to a mercury removal unit consisting of two adsorption towers connected in parallel so that one tower can be used for mercury removal while the other tower is shut down for reactivation. The packing of each tower consists of two adsorption beds in succession. Each bed consists of an 18 inch × 1 foot cylindrical layer of fused aluminum oxide chips (4–6 mesh) upon which are superimposed an 18 inch × 3 foot cylindrical layer containing 5/16 inch diameter spheres of the fused aluminum oxide-silver adsorbent described in Example 1. Effluent hydrogen from the adsorption tower contains less than 10 micrograms of mercury per cubic foot. After 30 days operation the hydrogen flow is diverted to the second adsorption tower, and the first tower is reactivated by heating at 240° for 1½ hours while passing a stream of dry nitrogen at 240° through the tower countercurrent to the direction of hydrogen flow. Substantially all of the mercury content of the nitrogen stream can be readily recovered by first cooling the nitrogen, whereby a part of the mercury is condensed out, and then passing the nitrogen containing residual mercury through a similar adsorption system.

It can thus be seen that a novel, improved process for reducing the concentration of mercury vapor in hydrogen has been provided. The foregoing examples illustrate the process of our invention and it will be obvious to those skilled in the art that considerable variation in the illustrative details can be made without departing from the spirit or scope of the invention.

We claim:

A continuous process for reducing the mercury content of hydrogen gas contaminated with mercury in amounts in excess of about 25 micrograms of mercury per cubic meter of hydrogen gas, an initial complete cycle of which comprises continuously passing said gas at a temperature below the boiling point of mercury through a first zone containing as a mercury adsorbent a mass of particles of aluminum oxide impregnated with silver metal, continuing said passage until the effluent hydrogen from said adsorbent contains in excess of about 25 micrograms of mercury per cubic meter of effluent gas, thereafter directing the flow of mercury-contaminated hydrogen to a second zone containing a fresh adsorbent mass of particulate aluminum oxide impregnated with silver; subjecting the spent adsorbent from said first zone to a temperature of at least about 200° C. while passing a steram of a dry gas through the adsorbent, to thereby volatilize and remove adsorbed mercury therefrom, continuing the flow of mercury-contaminated hydrogen through said second adsorbent zone until the effluent hydrogen from said second zone contains in excess of about 25 micrograms of mercury per cubic meter of gas, and thereafter redirecting the flow of mercury-containing hydrogen to the regenerated first zone adsorbent, and thereafter repeating the adsorption and regeneration cycles.

References Cited by the Examiner

UNITED STATES PATENTS

| | | | |
|---|---|---|---|
| 2,773,844 | 12/1956 | Carlson et al. | 252—447 X |
| 3,024,868 | 3/1962 | Milton | 55—75 X |
| 3,100,146 | 8/1963 | Huntington | 55—76 X |
| 3,193,987 | 7/1965 | Manes et al. | 55—72 |

FOREIGN PATENTS 1,075,953  2/1960  Germany.

OTHER REFERENCES

"Metals and Metallic Compounds," vol. IV (Evans), published by Longmans, Green, and Co., New York, 1923 (pp. 173–175).

REUBEN FRIEDMAN, *Primary Examiner.*

J. ADEE, L. H. McCARTER, *Assistant Examiners.*